(12) United States Patent
Finck (10) Patent No.: US 9,233,478 B2
(45) Date of Patent: Jan. 12, 2016

(54) METHOD AND APPARATUS TO CUT OUT A VEHICLE GLAZING PANEL

(75) Inventor: William Finck, Brentwood (GB)

(73) Assignee: BELRON HUNGARY KFY-ZUG BRANCH, Zug (CH)

( * ) Notice: Subject to any disclaimer, the term of this patent is extended or adjusted under 35 U.S.C. 154(b) by 1770 days.

(21) Appl. No.: 10/596,984

(22) PCT Filed: Sep. 14, 2005

(86) PCT No.: PCT/GB2005/003552
§ 371 (c)(1),
(2), (4) Date: May 8, 2007

(87) PCT Pub. No.: WO2006/030212
PCT Pub. Date: Mar. 23, 2006

(65) Prior Publication Data
US 2008/0017295 A1   Jan. 24, 2008

(30) Foreign Application Priority Data

Sep. 14, 2004   (GB) .................................. 0420468.1

(51) Int. Cl.
| | |
|---|---|
| *B32B 38/10* | (2006.01) |
| *B26D 1/547* | (2006.01) |
| *B32B 43/00* | (2006.01) |
| *B26B 7/00* | (2006.01) |
| *B60J 1/02* | (2006.01) |

(52) U.S. Cl.
CPC . *B26D 1/547* (2013.01); *B26B 7/00* (2013.01); *B32B 43/006* (2013.01); *B60J 1/02* (2013.01); *B65H 2701/354* (2013.01); *Y10T 156/1184* (2015.01); *Y10T 156/1967* (2015.01)

(58) Field of Classification Search
CPC ................. B32B 43/006; B26D 1/547; B65H 2701/354; B26B 7/00; B60J 1/02
USPC .................................................. 156/344, 584
See application file for complete search history.

(56) References Cited

U.S. PATENT DOCUMENTS 6,616,800 B2 *   9/2003   Eriksson ....................... 156/344

FOREIGN PATENT DOCUMENTS

| WO | WO 8607017 A1 * | 12/1986 |
| WO | WO 2004/014678 | 2/2004 |
| WO | WO 2004/103747 | 12/2004 |

* cited by examiner

*Primary Examiner* — Mark A Osele
(74) *Attorney, Agent, or Firm* — Gordon & Jacobson, PC (57) ABSTRACT

A winder unit (1) is disclosed for use with a cutting wire in cutting out a vehicle glazing panel. The unit is capable of being mounded to the glazing panel and includes first and second winder spools (4, 5) for winding cutting wire. At least one wire wrap around guide element (typically a pulley) is positioned away from the mounting means. The unit (1) may be used in various techniques either alone or with an auxiliary guide arrangement (2).

7 Claims, 7 Drawing Sheets

METHOD AND APPARATUS TO CUT OUT A VEHICLE GLAZING PANEL

BACKGROUND OF THE INVENTION

The present invention relates to a vehicle glazing panel cut out technique.

STATE OF THE ART

Vehicle glazing panels such as vehicle windscreens (windshields) are typically bonded in supporting frames by adhesive bonding material such as polyurethane, applied in a continuous bead about the periphery of the glazing panel and frame.

Wire cutting techniques have been previously proposed and used to effect glazing panel removal (for replacement or otherwise). Exemplary techniques are disclosed in, for example, EP-A-0093283, Canadian Patent Specification 2034221, U.S. Pat. No. 6,616,800, German Patent 4012207 and PCT Publications WO86/07017 and WO98/58779.

An improved technique and apparatus has now been devised.

SUMMARY OF THE INVENTION

According to a first aspect, the present invention provides a winder unit for use with a cutting wire in cutting out a vehicle glazing panel, the unit having:
mounting means for mounting the unit;
first and second winder spools for winding cutting wire; and,
at least one wire wrap around guide element spaced from the winder spools and/or the mounting means.

The wrap around guide element is preferably positioned to the side of a respective proximal winder spool.

The wrap around guide element preferably comprises a guide wheel or pulley rotatably mounted with respect to the unit. Preferably, the winder spools are arranged in side by side arrangement an a respective guide wheel or pulley is positioned outwardly of each respective winder spools. The guide wheel is preferably rotatably mounted relative to the unit. The guide wheels or pulleys are all preferably in the same plane, defined by the position of the wire. It is preferred that at least one of the winder spools includes a ratchet arrangement enabling in one or other direction to be inhibited. Beneficially, the ratchet is releasable to permit rotation in the inhibited direction. The mounting means desirably comprises on or more suction mounts. In one embodiment the unit may include four guide wheels or pulleys, to guide the wire, the guide wheels or pulleys being provided substantially at notional corners of a polygon.

The unit may be used with a wire to remove a glazing panel. Typically ends of the wire cross over and are connected to respective ones of the winding spools.

In certain techniques and embodiments the winder unit may beneficially be used in combination with a guide arrangement.

According to a further aspect, the invention provides a method of cut out of a vehicle glazing panel bonded in a frame by means of interposed bonding material, the method comprising:
setting a wire winder unit on the windscreen, the winder unit including a plurality of winder spools and at least one wire wrap around guide element positioned proximate a corner of the glazing panel;
setting a wire guide arrangement on the windscreen spaced from the wire winder unit, the wire guide arrangement including respective wire wrap around guide elements positioned proximate respective corners of the glazing panel;
looping a cutting wire about the periphery of the glazing panel and inserting first and second ends of the wire through the bonding material;
winding the wire from opposed ends by means of the winder spools.

It is preferred that the set position of the wire winder unit and the wire guide arrangement relative to the glazing panel remains substantially fixed throughout the cut out procedure. There is therefore no requirement to necessarily reposition the apparatus during the procedure.

Beneficially, the winder spools are spaced and the opposed end portions of the cutting wire are wound around respective spools, such that a wire crossover portion is created adjacent the winder spools.

The wire winder unit and wire guide arrangement are preferably set on the glazing panel internally of the vehicle, the cutting wire desirably being looped around the periphery of the glazing panel externally of the vehicle.

It is preferred that the one or more wrap around guide elements comprise rotatably mounted guide wheels.

In a preferred embodiment, the wire guide arrangement includes a mounting arrangement comprising one or more suction mounts.

In a preferred embodiment, the wire winder unit includes a mounting arrangement comprising one or more suction mounts.

Beneficially, in set up, the cutting wire is inserted to pass through the bonding material at a position proximate a corner of the glazing panel, more preferably at a position to the same side of the glazing panel as the wire winder unit, more preferably still, at a position substantially directly below the wire winder unit.

It is preferred that the wire wrap around guide elements of the guide arrangement are positioned to the same side of the glazing panel.

In a preferred technique, at set up, a longer length of cutting wire extends around the wrap around guide elements of the guide arrangement and is wound on a first winding spool of the winder unit, a shorter length of cutting wire extending around a wrap around guide element of the winder unit and being wound on a second winder spool of the winder unit. The wire beneficially defines a cross over point proximate the winder spools. It is preferred that, the spool connected to the shorter length of wire is first wound in to effect a first cut phase; the spool connected to the longer wire length being subsequently wound in.

Beneficially, during the procedure a ratchet of one of the spools is released facilitating slackening or more preferably unwinding (reverse winding) of a previously wound portion of the cutting wire.

The guide arrangement preferably includes a mount and a pair of positioning limbs extending from the mount at an apex defined by the proximal ends of the limbs, each said limb carrying at its distal end a respective wrap around guide element for the cutting wire. Desirably, the wrap around guide elements comprise guide wheels rotatably mounted to the respective limbs. Beneficially, the limbs are pivotally connected to the mount such that the angle between the limbs can be varied. The limbs are preferably pivotally connected to the mount such that the limbs can pivot in two mutually perpendicular axes. In a preferred embodiment, the pivotal mount comprises a ball and socket type connection. It is preferred that the apex mount comprises a suction mount.

It is preferred that one or both (preferably both) limbs is provided with a further mount intermediate the opposed ends of the limb. Desirably, the further mount comprises a suction mount. The further mount is preferably adjustable to be secured at various positions along the length of the limb. Alternatively or additionally, the further mount is adjustable with respect to its angular orientation about the longitudinal axis of the limb. It is preferred that the further mount is adjustable to the position of the mount below the limb.

The winder unit preferably comprises:
mounting means for mounting the unit;
first and second winder spools for winding cutting wire; and,
at least one wire wrap around guide element positioned away from the mounting means.

Beneficially, the wrap around guide element comprises a guide wheel rotatably mounted with respect to the unit. Desirably, the mounting means comprises on or more (preferably a pair of) suction mounts.

According to a further aspect, the present invention provides apparatus for use in cutting out a vehicle glazing panel using cutting wire, the apparatus comprising:
a winder unit comprising:
mounting means for mounting the winder unit;
first and second winder spools for winding the cutting wire; and,
at least one wire wrap around guide element positioned away from the mounting means; and,
a guide arrangement including mounting means for mounting the guide arrangement and a pair of positioning limbs extending from the mount at an apex defined by the proximal ends of the limbs, each said limb carrying at its distal end a respective wrap around guide element for the cutting wire.

Preferred features of the apparatus are as described and exemplified herein.

The invention will now be further described in a specific embodiment by way of example only and with reference to the accompanying drawings, in which;

DETAILED DESCRIPTION OF THE PREFERRED EMBODIMENTS

Figure 1:
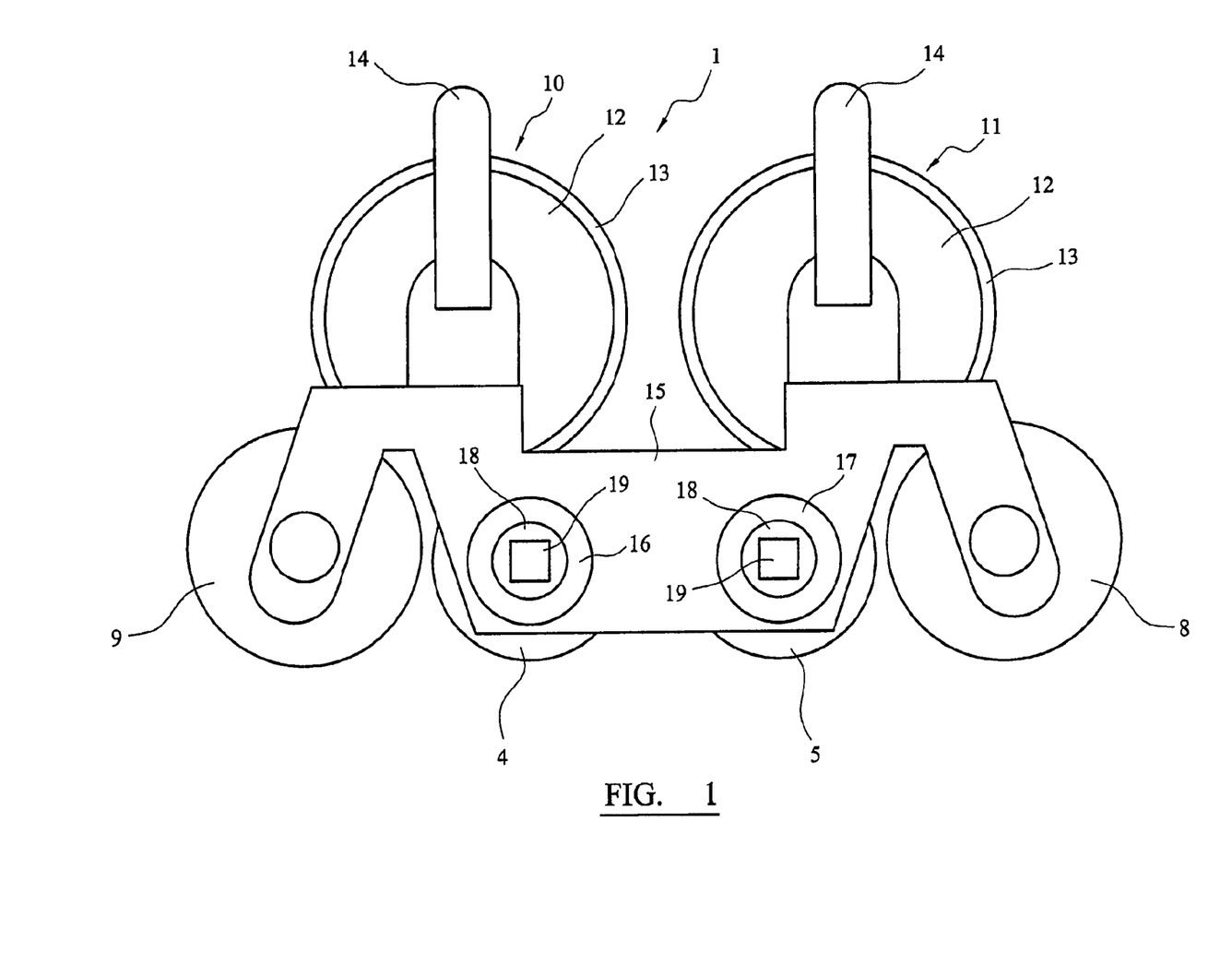
FIG. 1 is a schematic plan view of a winder unit of an exemplary cut out system in accordance with the invention.
Figure 2:
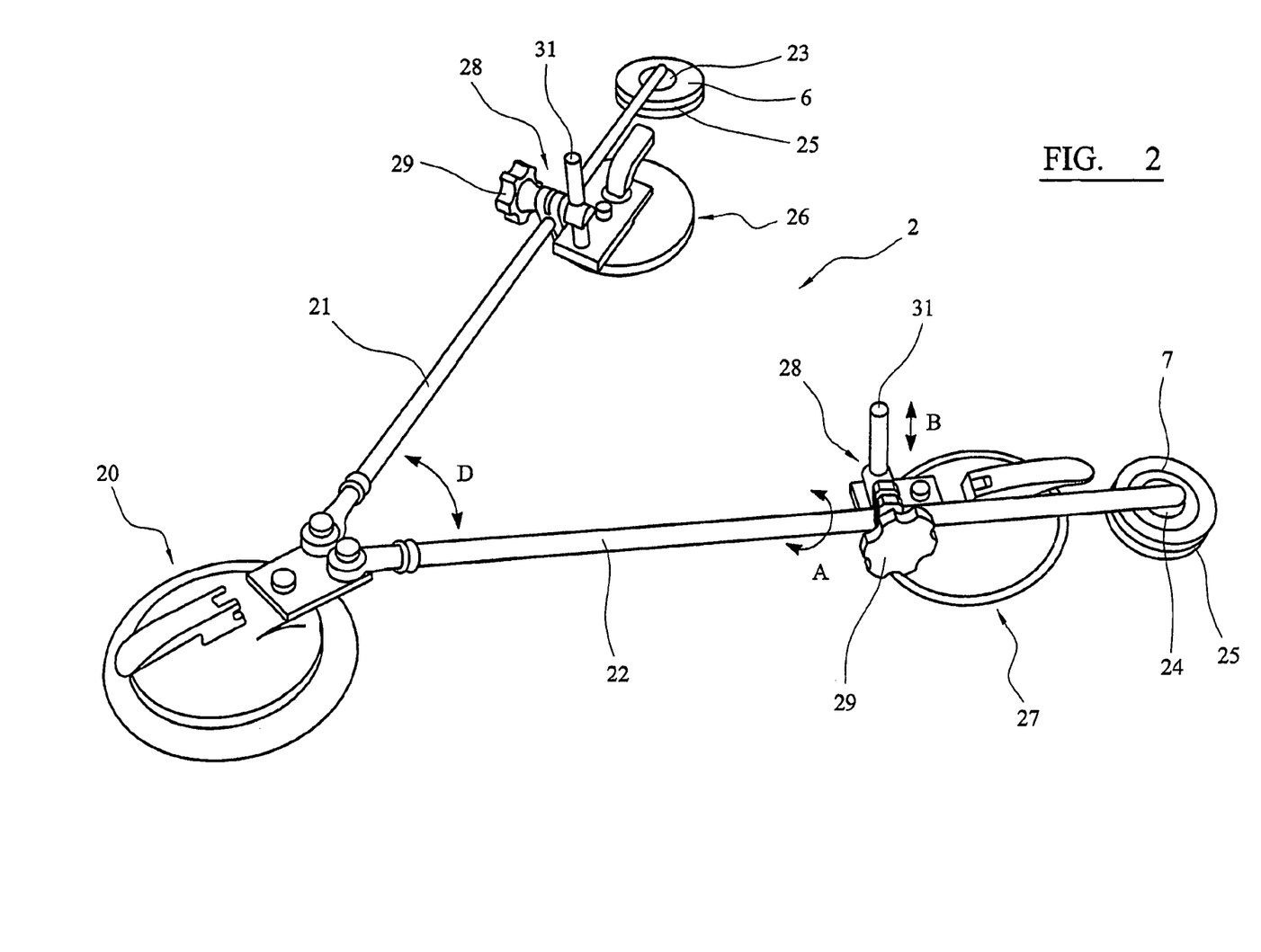
FIG. 2 is a schematic representation of a guide arrangement for use with a winder unit in accordance with an exemplary cut out system of the invention.
Figure 3A:
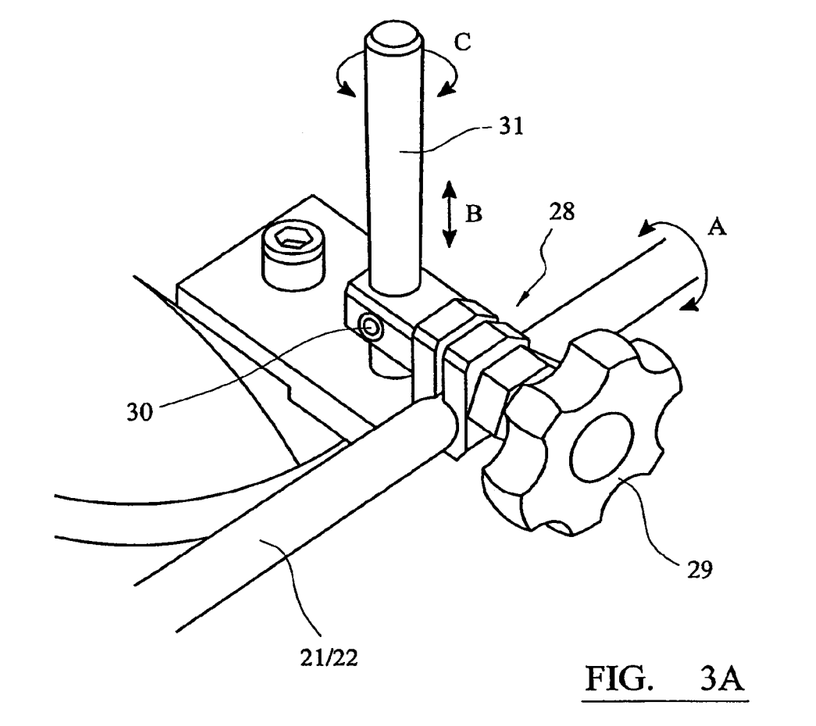
FIGS. 3a and 3b are detailed views of a parts of the guide arrangement of FIG. 2.
Figure 3B:
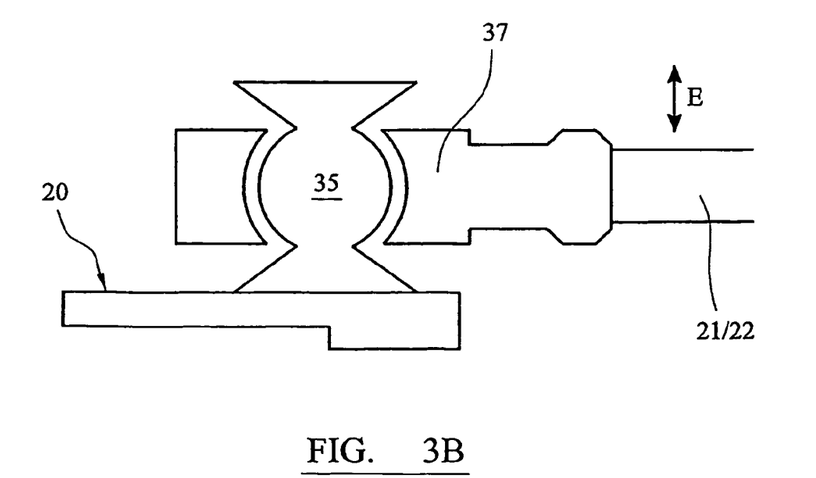

Referring to the drawings, and initially to FIGS. 1 to 3, there is shown a cut out system particularly for use in cut out of bonded vehicle glazing panels such as windscreens. The cut out system comprises a winder unit 1 and a guide arrangement 2. A flexible cutting wire is looped around the outside of a windscreen glazing panel to lie peripherally adjacent the bonding bead (typically a polyurethane bonding bead) which is sandwiched between the glazing panel and the support frame of the vehicle. Opposed ends of the cutting wire are fed through a pierced channel made through the bonding bead as will be described in detail and the free ends are then each wound around a separate winder spool 4, 5 of the winder unit. As will be described the long end of the wire is passed around the guide pulley wheels 6, 7 of the guide arrangement 2 and a first one 8 of the guide pulleys of the winder unit 1; the shorter end of the cutting wire being passed around the other of the guide pulleys 9 of the winder unit.

The winder unit 1 comprises a pair of releasable suction cup mounts 10, 11 enabling the winder unit to be releasably secured to the windscreen. The suction cup mounts comprise a rigid plastics cup 12 and underlaying flexible rubber skirt membrane 13. Respective actuation/release levers 14 enable consistent suction to be applied and released. Such suction mounts are commonly employed in windscreen replacement and repair technology. The suction cup mounts 10, 11 are pivotably/tiltably mounted to the support bracket 15 of the winder unit to ensure that both mounts 10, 11 can locate in good engagement with the windscreen despite the curvature of the windscreen. The main body of the support bracket 15 carries a pair of underslung winding spools 4, 5 in side by side relationship. The spools are connected to axial winding shafts which are supported in bearings 16, 17 provided on the winder unit. The spools 4, 5 are driven axially rotationally either manually via a hand winder or by means of a mechanical actuator such as a motorised winding or winching tool. Drive bosses 18 are provided with female sockets 19 (square bores) for receiving the male driving tool. Positioned outwardly of the winding spools are respective wire guide pulley wheels 8, 9 of low friction plastics material. The pulley wheels are mounted to be rotatable about respective rotational axes. The guide pulleys rotate as the cutting wire is drawn tangentially across the pulleys as will be described. The winder spools 4, 5 are held to rotate in one direction only (each in opposite senses) by respective ratchet mechanisms. Each mechanism includes ratchet override permitting prior tightened wire to be slackened, or unwound (reverse wound).

The guide arrangement 2 comprises an apex suction cup mount 20 from which extends angularly spaced arms 21, 22 each of which carry at their respective distal ends a respective distal guide pulley wheel 6, 7. The distal guide pulley wheels 6, 7 are manufactured of low friction plastics material and mounted rotatably to the distal ends of the arms on respective support bosses 23, 24. each pulley wheel includes a peripheral channel 25 within which the cutting wire locates. Each arm 21, 22 is provided with a respective distal suction cup mount 26, 27. The distal suction cup mounts 26, 27 are slidable along the respective arms 21, 22 and provided with securing clamps 28 actuated by a turn handle 29 to secure the respective distal suction cup mount at the desired position along the length of the respective arm. The securing clamps also permit angular rotation of the distal suction cups about the circumferential outer surface of the rod (arrow A in FIGS. 2 and 3a) comprising the respective arm. The depth of the suction cup mounts below the respective arms is also adjustable (arrow B in FIGS. 2 and 3a) by means of the suction cup mount including an upstanding post 31 about which the clamp 28 relatively slides and secures by means of a grub screw 30. The suction cup mount 26, 27 can also pivot about the upstanding support post 31 (arrow C in FIG. 3a). The proximal ends of the arms are mounted to the apex suction mount 20 by means of respective spherical surface profile bosses 35 about which part spherical annular bushed bearings 37 are mounted. These mountings permit the angle between the arms to be adjusted (arrow D in FIG. 2) to suit the configuration and size of the subject windscreen. Also the angle between the arm axis and the surface of the windscreen can be varied to suit the curvature of the windscreen (arrow E in FIG. 3*b*). The arrangement of the guide system as described ensures that the distal guide pulley wheels 6, 7 can be accurately positioned in close proximity to the corners of the windscreen, and that the distal suction cup mounts 28 can be conveniently located to provide secure support proximate the distal pulley wheels 6, 7. Because the arms 21, 22 are both mounted to the apex suction cup mount 20 the whole guide arrangement is securely held to the windscreen the arms taking up the considerable bracing forces exerted by the cutting wire in tension. In view of the large forces generated in the wire during winding, it is important that the guide arrangement is sufficiently securely held secured to the windscreen and of sufficient structural integrity.

Referring to FIGS. 4 to 8 in which operation of the system to cut out an exemplary body such as a vehicle windscreen is described. The present technique enables the positioning of the system apparatus to achieve cut out with little or no subsequent re-positioning of the system apparatus. The set up is therefore an important phase of the technique.

Figure 4:
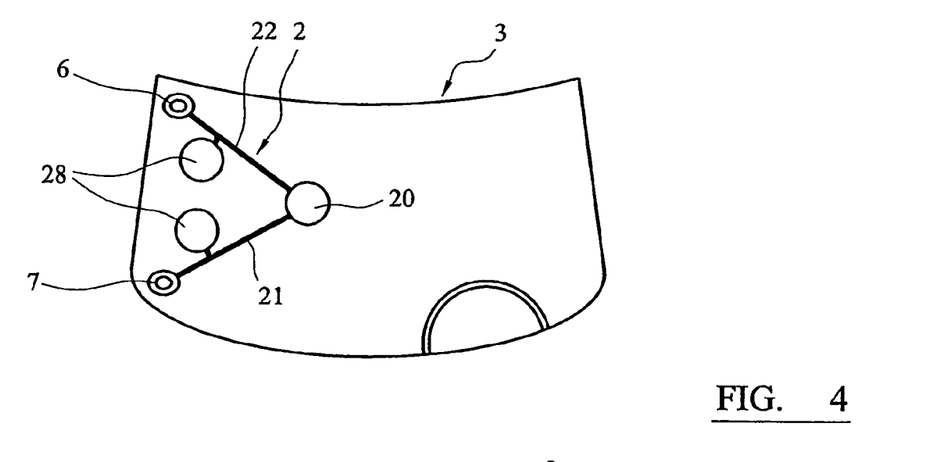
FIGS. 4 to 8 are schematic representations in sequence of a cut out technique in accordance with the invention.

The guide arrangement 2 is initially attached via the suction cup mounts 20, 28 to the inside of the windscreen as shown in FIG. 4. The aim is to position the pulley wheels 6, 7 as far into the upper and lower corners of one side of the windscreen as possible, with as little separation between the glass and the pulley wheel as possible. Usually the guide arrangement pulley wheels 6, 7 are positioned to the non-driver side of the vehicle. In the right hand drive embodiment shown the guide arrangement pulley wheels 6, 7 are positioned in the upper and lower left hand corners of the windscreen. The suction pads are positioned with this consideration and the adjustable clamps used to fine tune the positioning.

Figure 5:
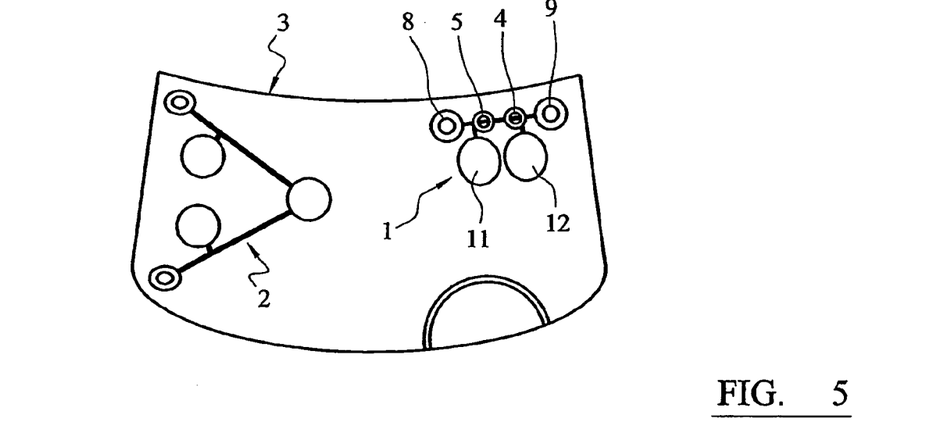

The winder unit 1 is secured to the underside of the windscreen to the opposite side of the windscreen, along the top edge with the pulleys in side by side relationship such that one of the pulley wheels (pulley wheel 9) is positioned as far into the top corner as possible. This arrangement is shown in FIG. 5.

Figure 6:
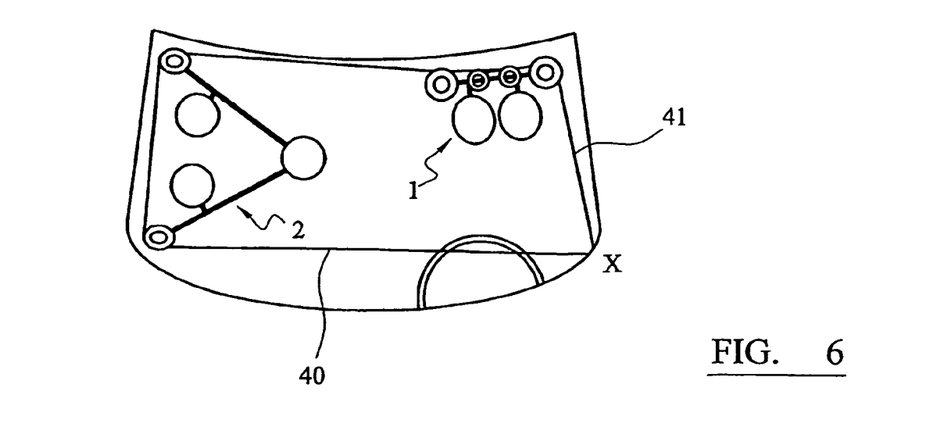
Figure 7:
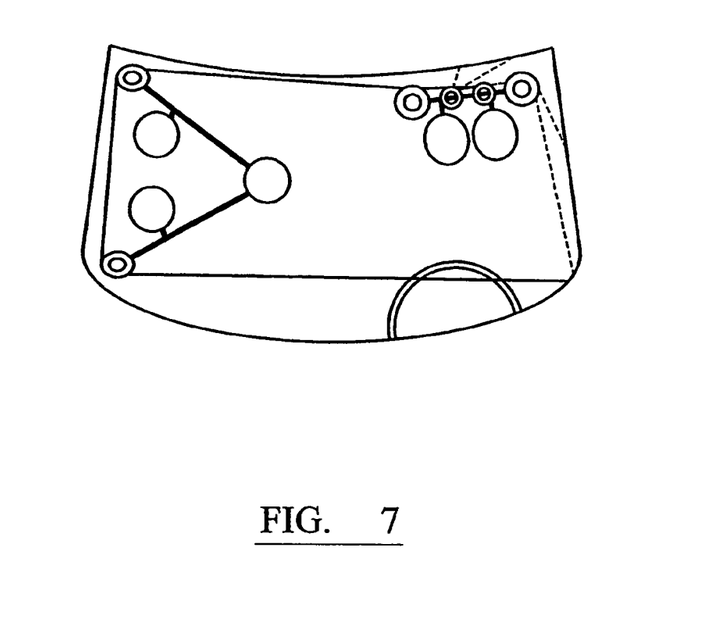
Figure 8:
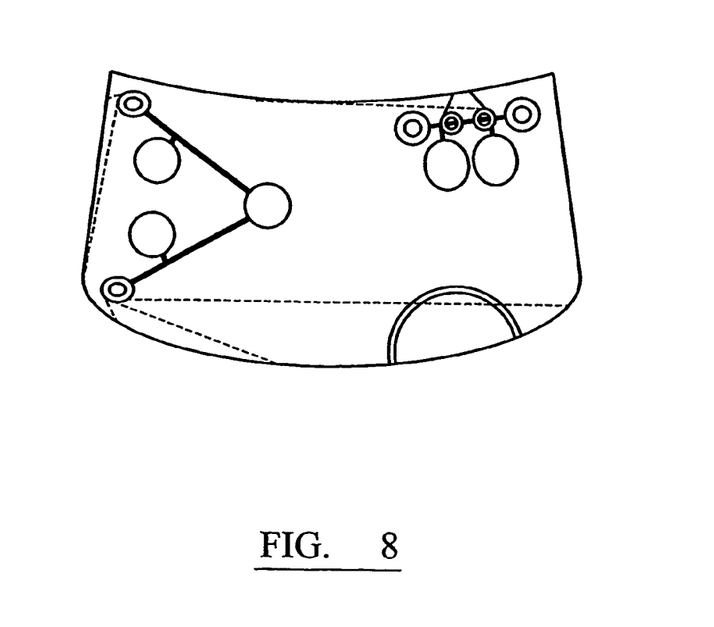

The cutting wire preferred for use is generally square in cross section as is known for use in other modalities of windscreen removal. With the winder unit and guide arrangement in position as described, the cutting wire is looped around the outside of the windscreen to lie peripherally adjacent the bonding bead which is sandwiched between the glazing panel and the support frame of the vehicle. Opposed ends of the cutting wire are fed through a pierced channel made through the bonding bead in the corner of the windscreen (x) below the position of the winder unit 1. A longer end length 40 of the wire is pulled through to the interior of the vehicle and passed around the two pulley wheels 6, 7 of the guide arrangement and connected for winding to the winder spool 4 of the winder unit closest to the corner in which the winder unit is mounted. The shorter end length 41 of the wire is fed adjacent the inside of the windscreen and passed around the pulley wheel 9 of the winder unit closest to the corner in which the winder unit is mounted before being connected for winding to the other winder spool 5 (the ends of the wire therefore cross in order to connect to the respective winder spools 4, 5 of the winder unit. The situation as described is shown in FIG. 6. This concludes the set up phase of the technique.

The first phase in the cutting procedure is to wind the wire shorter end length 41 by winding in on the left hand winding spool 5; this causes the cut line to move upwardly through the bonding bead and around the upper corner of the windscreen proximate to the winder unit, passing along a short portion of the upper edge of the windscreen. The shorter end length takes up sequential positions as shown by the dashed line in FIG. 7. At this point the ratchet is released and the spool is rewound a little until the wire becomes slightly slack. The reason for this is described later in the procedure.

Operation of the other winder spool 4 of the winder unit 1 effects a cut along the bottom edge of the windscreen up the side of the windscreen proximate the guide arrangement and along the top edge of the windscreen. The sequential interior wire length positions are shown in dashed line in FIG. 8. Initially, after the wire has come clear of the lower guide pulley wheel, the ratchet previously released from the first operated winder spool is reactivated. Continued operation of the second winder spool 4 moves the cut line around the top corner of the windscreen and along the upper edge of the windscreen (from left to right as shown in the drawings) crossing over the shorter wire length portion above the winder unit to effect complete cut out of the windscreen.

As described above the ratchet of the first used winder spool 5 is released following the first, short length cut. This is because in the second cut stage in which the longer length wire is wound in and in which the cut line moves from right to left along the lower edge of the windscreen in the drawings, the thicker excess bonding material that is likely to be encountered in this region of the windscreen will be tough to cut through, increasing the forces transmitted through the system. By deactivating the ratchet of the first winder spool 5, the wire will slip/slide at this point, feeding back off the first spool to an extent resulting in a cutting slicing action that aids the cut effectiveness at this point. When the tougher cut has been accomplished, the wire will again follow the path of least resistance and resume cutting normally (and the wire will stop back feeding off the first winder spool). This system tweak reduces the likelihood of the wire breaking due to excessive tension. The ratchet can then be reapplied. The point at which the ratchet should be reapplied and deactivated typically comes down to operator skill, experience and judgement.

Figure 9:
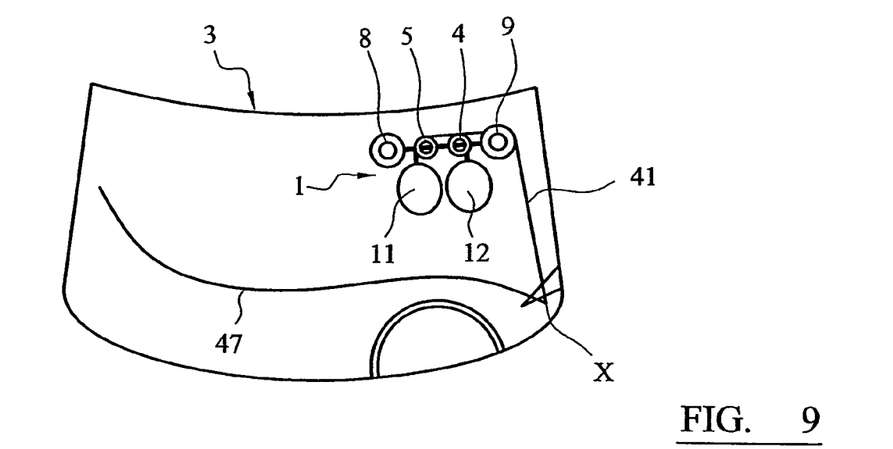
FIGS. 9 to 11 are schematic representations in sequence of an alternative technique in accordance with the invention.
Figure 10:
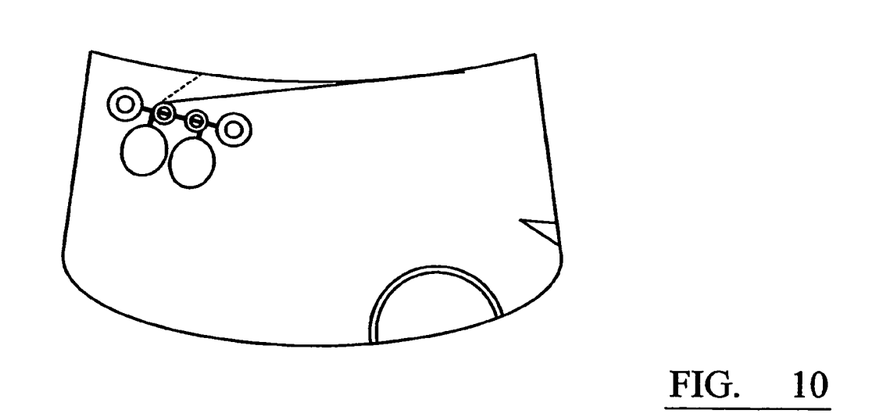

In the technique shown in FIGS. 9 and 10, the glazing panel is removed using a wire 41 and the winder unit 1 only (no additional guide, such as guide 2 is required). In this technique the winder unit is initially secured to the steering wheel side of the glazing panel, positioned above the steering wheel as shown in FIG. 9. With the winder unit and guide arrangement in position as described, the cutting wire is looped around the outside of the windscreen to lie peripherally adjacent the bonding bead which is sandwiched between the glazing panel and the support frame of the vehicle. Opposed ends of the cutting wire are fed through a pierced channel made through the bonding bead in the corner of the windscreen (x) below the position of the winder unit 1.

A length 41 of the wire is pulled through to the interior of the vehicle and passed around pulley wheel 9 of the winder unit and connected for winding to the winder spool 5 of the winder unit. A free end length of wire 47 is pulled through, being of length sufficient to reach the upper left hand corner of the glazing panel. Winder spool 5 is then operated to cause the wire length 41 to cut through the bonding bead upwardly along the side of the windscreen, until the cut line has passed around the upper right hand corner of the screen. At this juncture, the unit 1 is removed from the screen and repositioned on the glazing panel in the upper left hand corner as shown in FIG. 10. Prior to repositioning the unit 1, the ratchet of winder spool 5 is released to permit the wire to be wound out from the spool as it is moved across the glazing panel to be repositioned. The ratchet is subsequently re-engaged and spool 5 once again operated to wind in the wire from the position shown in FIG. 10 until it reaches the position shown in the dashed line in FIG. 10.

Figure 11:
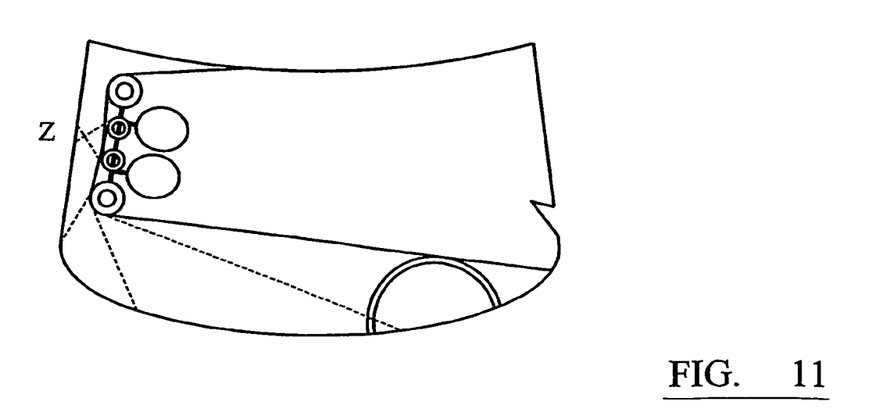

Next the unit 1 is moved around the corner of the glazing panel and through substantially a right angle, to the position shown in FIG. 11, where it is secured to the glazing panel. In order to enable this the ratchet of spool 5 is again released and subsequently re-engaged when the unit is in position as shown in FIG. 11. The end of the free length of wire 47 is then wound around pulley 8 and connected to winder spool 4 and the spools 4 and 5 operated either sequentially (or simultaneously) to complete the cut. As shown in FIG. 11. The lengths of wire cross at Z in order to complete the cut. The presence of the pulleys 8, 9 spaced outwardly from the respective spools 4,5 aids in operation of the winder unit during the cutting process.

Figure 12:
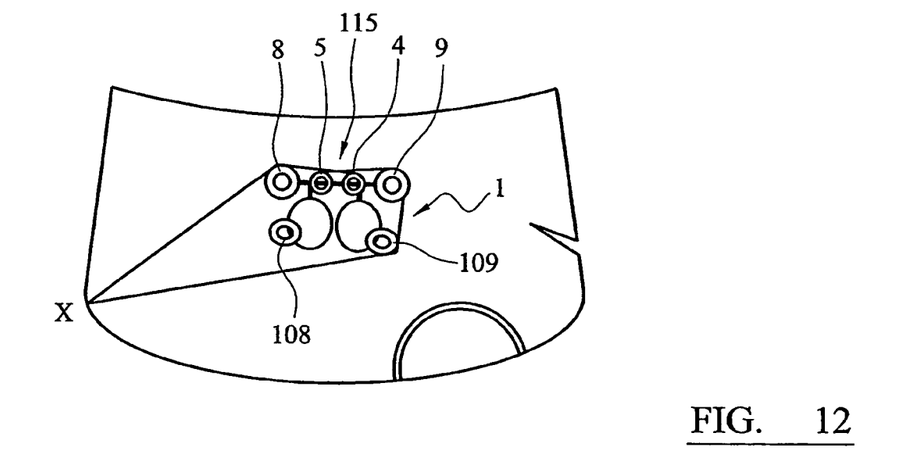
FIG. 12 is a schematic representation of a further technique in accordance with the invention.

In FIG. 12 there is shown a modified winder unit 1 having additional wrap around pulleys 108, 109, positioned to provide a respective pulley at four respective corners. The unit is mounted as shown in FIG. 12 approximately central to the glazing panel. The wire is looped around the exterior of the panel with two ends of the wire passing through a channel at X into the interior of the vehicle. The free ends are secured to respective spools 4,5 with a wire crossover at 115. Operation of the spools 4,5 to wind in respective lengths of wire from the position shown results in cut through being effected about the entire periphery of the glazing panel.

Figure 13:
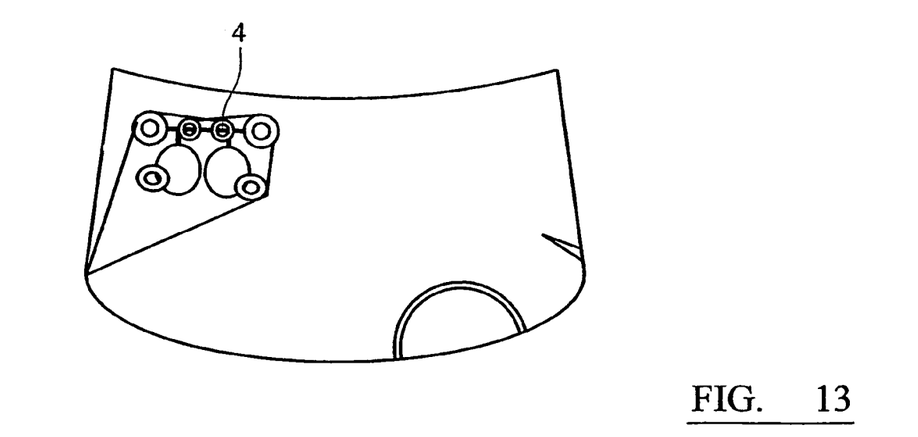
FIGS. 13 and 14 are schematic representations of a further alternative technique in accordance with the invention.
Figure 14:
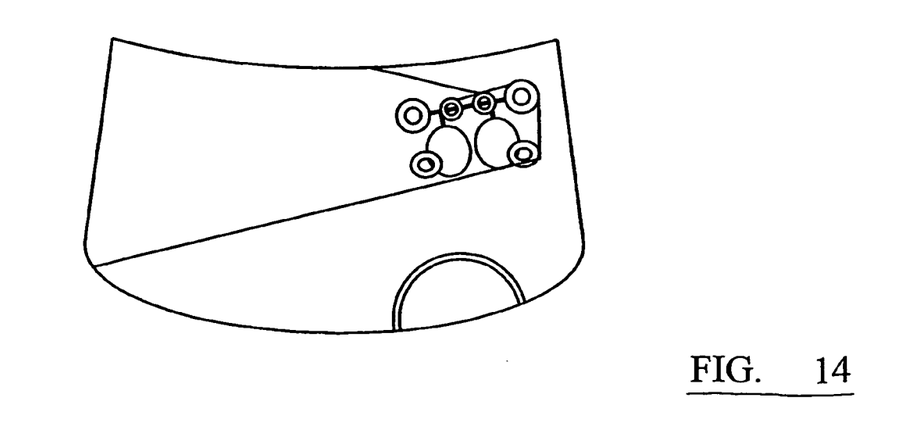

In a modification to this technique the four pulley winder unit is used as shown in FIGS. 13 and 14. The unit is initially positioned as shown in FIG. 13, and pulley wheel 4 initially operated to wind the wire around the upper left hand corner of the glazing panel. Subsequently the unit is repositioned to the position shown in FIG. 14 and both winder spools 4 and 5 operated (typically in sequence) to complete the cut through process.

The present invention provides the benefits of wire cutting systems without over complex system apparatus arrangements or the need to re configure the apparatus significantly following initial set up. The technique can be used by operators of relatively little experience or physical strength following an initial set up routine of minimal complexity.

The invention claimed is:

1. A winder unit for use with a cutting wire in cutting out a vehicle glazing panel, the unit comprising:
   mounting means for releasably mounting the winder unit on the vehicle glazing panel;
   first and second winder spools for winding the cutting wire; and
   first and second wire wrap around guide elements spaced from the first and second winder spools and the mounting means, wherein the first and second wrap around guide elements each comprise a guide wheel or pulley rotatably mounted with respect to the unit and providing a rotatable interface over which the cutting wire passes whilst being wound by the first and second winder spools;
   wherein the first and second winder spools are arranged in a side by side arrangement, the guide wheel or pulley of the first wrap around guide element is located in a position outwardly of one of the first and second winder spools, and the guide wheel or pulley of the second wrap around guide element is located in a position outwardly of the other of the first and second winder spools.

2. A winder unit according to claim 1, wherein:
   at least one of the first and second winder spools includes a ratchet arrangement enabling spool rotation in a first direction and inhibiting spool rotation in an opposed second direction.

3. A winder unit according to claim 2, wherein:
   the ratchet arrangement is releasable to permit spool rotation in both the first and second directions.

4. A winder unit according to claim 1, wherein:
   the mounting means comprises at least one suction mount.

5. An apparatus for use with a cutting wire in cutting out a vehicle glazing panel, the apparatus comprising:
   a winder unit according to claim 1; and
   a guide arrangement including mounting means for mounting the guide arrangement on the vehicle glazing panel and a pair of positioning limbs extending from the mount at an apex defined by the proximal ends of the limbs, each said limb carrying at its distal end a respective wrap around guide element for the cutting wire.

6. A winder unit according to claim 1, further comprising:
   a unitary support structure;
   wherein the mounting means, the first and second winder spools, and the first and second wire wrap around guide elements are all mounted to the unitary support structure.

7. A winder unit according to claim 6, wherein:
   the unitary support structure comprises a support bracket.

* * * * *